United States Patent [19]
Häfner

[11] Patent Number: 6,041,664
[45] Date of Patent: Mar. 28, 2000

[54] METHOD AND APPARATUS FOR CONTINUOUS, GRAVIMETRIC METERING AND MASS FLOW DETERMINATION OF FLOWABLE MATERIALS

[75] Inventor: Hans Wilhelm Häfner, Aichach-Walchshofen, Germany

[73] Assignee: Pfister GmbH, Augsburg, Germany

[21] Appl. No.: 08/849,489

[22] PCT Filed: Dec. 5, 1995

[86] PCT No.: PCT/EP95/04786

§ 371 Date: Jun. 5, 1997

§ 102(e) Date: Jun. 5, 1997

[87] PCT Pub. No.: WO96/18088

PCT Pub. Date: Jun. 13, 1996

[30] Foreign Application Priority Data

Dec. 5, 1994 [DE] Germany .............. 44 43 053

[51] Int. Cl.[7] .................................. G01F 1/82
[52] U.S. Cl. .................. 73/861.353; 73/861.354
[58] Field of Search ............ 73/861.351, 861.352, 73/861.353, 861.354

[56] References Cited

U.S. PATENT DOCUMENTS

| | | | |
|---|---|---|---|
| 2,598,220 | 5/1952 | Dodds | 73/861.354 |
| 3,308,662 | 3/1967 | Maurer | 73/861.351 |
| 4,528,848 | 7/1985 | Hafner | 73/218 |
| 5,301,555 | 4/1994 | Häfner | 73/861.354 |
| 5,359,900 | 11/1994 | Hafner | 73/861.37 |

*Primary Examiner*—Harshad Patel
*Attorney, Agent, or Firm*—Knobbe, Martens, Olson & Bear LLP

[57] ABSTRACT

In order to improve the metering accuracy, especially with a strongly fluctuating feed material supply, a method and an apparatus for continuous, gravimetric metering and mass flow determination of flowable materials are proposed, wherein the output of the metering device (8) is regulated with a time offset to match the set-point flow rate in dependence on the instantaneous mass flow determined at the flowmeter (4).

15 Claims, 3 Drawing Sheets

METHOD AND APPARATUS FOR CONTINUOUS, GRAVIMETRIC METERING AND MASS FLOW DETERMINATION OF FLOWABLE MATERIALS

This invention relates to a method and an apparatus for continuous, gravimetric metering and mass flow determination of flowable materials, with a flowmeter, especially a Coriolis measuring wheel, for determining the instantaneous mass flow and a metering device downstream of the flowmeter.

Such an installation for continuous, gravimetric feeding and/or mixing of bulk material is known from DE 4 023 948 A1, wherein a metering rotor balance according to DE 3 217 406 A1 or EP-A 0 198 956 is utilised. A collector device supported on force measuring cells with a bucket wheel gate is connected in a closed pneumatic conveyor passage downstream of this metering device following a bulk material feed line. Through this the bulk material mass located therein can be continuously determined and either the speed of rotation of the bucket wheel gate or the total air flow amount of the feed blower can be influence by this, so that the bulk material throughput can be influenced by varying the amount of air supplied per unit time. A computer controlled central metering control system is used for corresponding regulation of the desired mixing ratio or the desired feed amount per unit time (feed rate), as is described in DE 3 217 406 A1 for example, wherein the weighing signal of the bin weighing cells serves as the input signal and the speed of rotation of the metering rotor in particular and optionally of the bucket wheel gate for the bulk material feed are regulated. However a certain regulation dead time can occur up to the regulation to the set-point feed rate.

This regulating system is described in more detail in EP-A 0 198 956 cited above, wherein the bulk material mass acting instantaneously in the rotor weighing path is detected in the metering rotor balance, from which the bulk material mass flow rate is given by multiplying by the angular velocity of the metering rotor. The weighing electronics store the instantaneous bulk material mass located on the rotor balance path (measuring path), so that shortly before the discharge of the bulk material to the pneumatic feed line, the rotor angular velocity can be varied in accordance with the predetermined set-point feed rate, so that the metering rotor is accelerated or slowed down. A relatively high metering accuracy results from this, which is very well suited to metering finely divided bulk material, for example in coal dust metering for rotary cement kilns or metering additives in flue gas purification.

With certain feed materials however, such as additives for mixing in for flue gas purification in power stations, furnace installations and the like, account has to be taken of the fact that these bulk material can tend to "ball" or even form bridges, depending on the degree of moisture, fluidization, fineness and the like, so that random or strongly pulsating mass flow fluctuations can occur in the bulk material feed. In this case the previously described metering apparatus is hardly able to compensate any more for the short-term mass flow fluctuations, since the metering rotor has a substantial self mass of some hundreds of kilograms, especially in a shock-resistant design, so that the changes in angular velocity needed to keep the feed rate constant with strongly fluctuating mass flows and thus strong acceleration or retardation of the metering rotor are hardly possible any more, because of the inertial mass.

These positive and negative fluctuations can be partially compensated in the first-mentioned installation for feeding and/or mixing bulk material, in the form of a mean value formation, in that a collecting container supported on force measuring cells is provided. However, such a compensating container substantially increases the cost of the structure and the demand on space. The discharge through the output device in the form of a bucket wheel gate is in addition relatively inaccurate, because of the volumetric measuring principle in the pockets of the bucket wheel gate.

A Coriolis measuring wheel is described in DE-PS 1 211 415, following which is connected a conveyor auger, which is driven by a motor whose speed of rotation is determined by a pulse source. The speed of rotation of the drive motor of the conveyor auger serves only as a reference value, while an electronic control gear controls a preceding shaker tray above the Coriolis measuring wheel in accordance with the reference speed of rotation of the conveyor auger. Short-term fluctuations of the mass flow are thus again not compensated.

U. S. Pat. No. 4,805,463 also describes a method and an apparatus for mass flow determination, wherein a measuring wheel is provided, on which the bulk material is fed along a semicircle. The centrifugal force on a weighing cell arranged at the side is measured by means of a hub mounted on leaf springs. The measuring wheel requires a raised edge on account of the centrifugal measuring principle. Emptying the measuring wheel is made difficult by this. In addition only a measuring apparatus is described herein; with no following metering device, since the adjustment in dependence on the measurement results is effected on a preceding paddle wheel.

DE-A 3 633 694 is directed to the fact that the torque and the speed of rotation are measured simultaneously with a Coriolis measuring wheel and the feed rate is determined therefrom. There is likewise no following metering device for increasing the metering accuracy.

According to DE-A 3 536 347 a flow rate balance is provided in the form of a tube balance, wherein the associated weighing cells supply the weight signal, which controls a regulating vane after comparison with the set-point feed rate. However, on account of the bulk material amount feeding at the same time into the weighing vessel and thus jerky loadings of the weighing cells, only a coarse regulation is possible. In addition, especially with a largely closed regulating vane and following opening, as is necessary with strongly fluctuating feed, there is the danger of forming bridges of the bulk material and thus of completely inadequate metering.

Accordingly the invention is based on the object of providing a method and an apparatus for continuous, gravimetric metering and mass flow determination, especially for bulk materials, with which an improved metering accuracy is obtained in a simple way, even with strongly fluctuating feed material supply.

This object is met by a method and apparatus according to the present invention.

Through the time offset regulation of the downstream metering device and thus of the discharge to regulate the flow rate in direct dependence on the instantaneous mass flow determined at the flowmeter, a high accuracy compensation of disturbance values results before transfer of the bulk material to the place of use or the process plant, so that a particularly high short-term metering accuracy is attained. Regulation of the actual flow rate to the given set-point value is effected without dead time, since it is determined precisely when the mass deviation occurs at the output point and in accordance with this, it can be compensated by a time-offset increase or reduction of the feed speed. This is particularly important in metering coal dust in order to obtain a constant combustion process or in flue gas purification. This compensation of disturbance values on account of random or pulsating mass flow fluctuations in the metering, still before the transfer of the feed material to the chemical or thermal process, thus facilitates a particularly high short-term metering accuracy in the form of an anticipatory regulation, wherein a highly accurate mass flow determination is allowed over a wide range of adjustment of the set-point feed rate, especially when using a Coriolis measuring wheel.

Preferred embodiments are the subject matter of the dependent claims.

Several embodiments will now be explained and described in more detail with reference to the drawings, in which.

Figure 1:
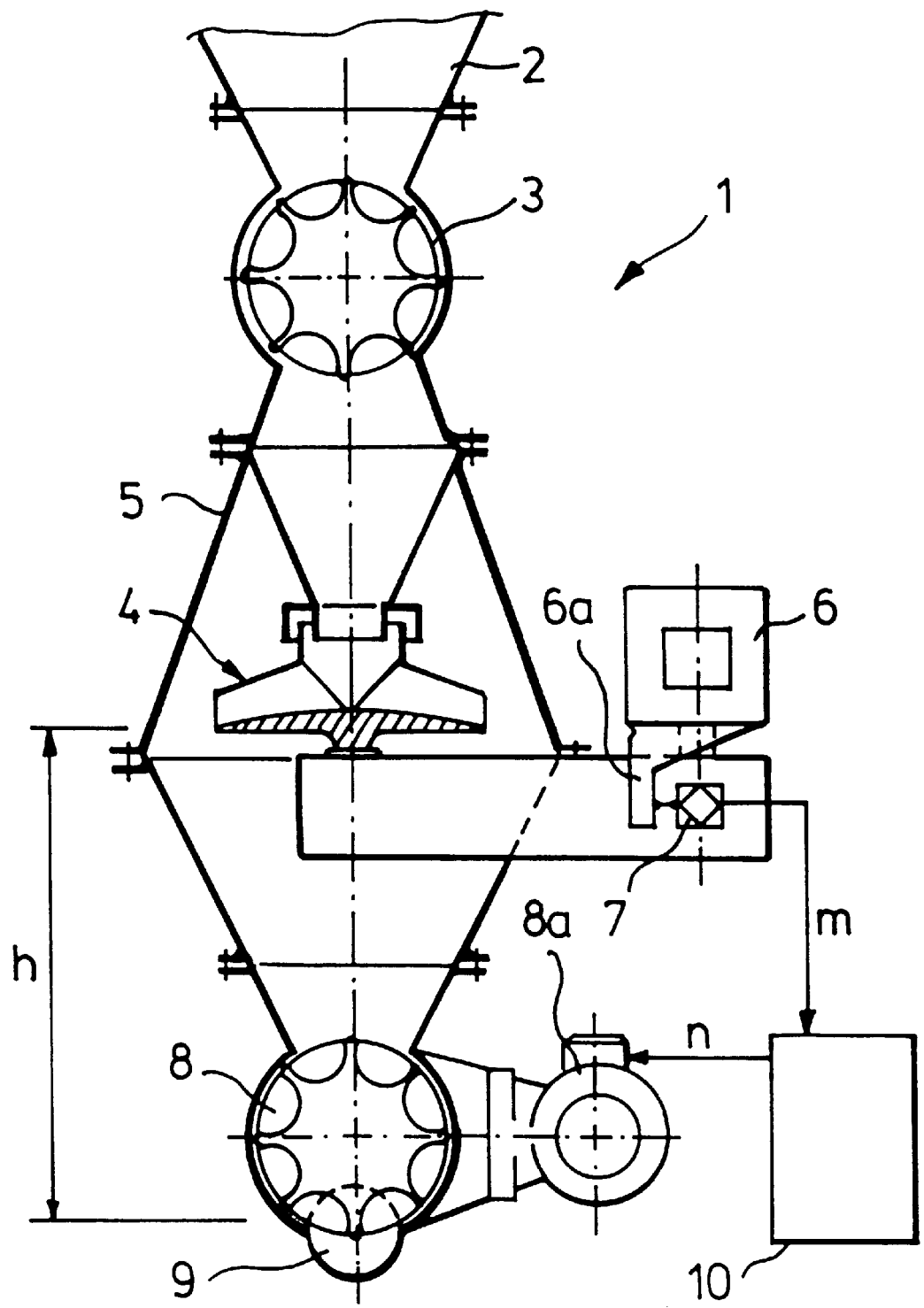
FIG. 1 is longitudinal sectional view through an apparatus for continuous, gravimetric metering and mass flow determination, with a flowmeter according to the Coriolis principle.

An apparatus 1 for continuous, gravimetric metering and mass flow determination is shown in FIG. 1, wherein the feed material, especially a fluid bulk material to be metered in accordance with an adjustable set-point feed rate, is fed out of a bin or silo 2 by means of an outlet device 3, here in the form of a bucket wheel gate. The feed material passes to a flowmeter 4, which is arranged inside a housing 5 and defines a measuring path therewith. The flowmeter 4 is preferably in the form of a Coriolis measuring wheel, such as is described in more detail in DE 4 134 A1. This Coriolis measuring wheel is mounted on a drive housing extending sideways out of the housing 5 and is driven by an electric motor 6, which is supported on a force measuring cell 7 by a cantilever arm 6a allowing limited swinging movement. The necessary torque on the measuring wheel rotating with approximately constant speed of rotation changes in accordance with the Coriolis force acting thereon, whereby the change in the drive torque and thus the reaction moment on the laterally arranged force measuring cell 7 is directly proportional to the mass of the material stream flowing through.

However, in order to detect the torque change and thus determine the mass flow, the power drawn by the drive motor can also be utilized. The flowmeter 4 according to the Coriolis measuring principle has the advantage of a very high measuring accuracy, so that this form of flowmeter 4 is at preferred. However, other flowmeters can also be utilized, such as bounce plate flow rate balances or inductive or capacitive flowmeters.

A metering device 8 is provided at the lower end of the housing 5, again in the form of a bucket wheel gate, which is driven by a motor 8a with a controllable speed of rotation and opens into a blow-out line 9. It is essential here that the measured value pickup of the flowmeter 4, here thus the force measuring cell 7, is connected to a metering controller 10, which thus determines the instantaneous mass flow and relates it to the set-point feed rate and controls the motor 8a of the metering device 8 in direct consequence, in order to vary its speed of rotation or angular velocity and thus keep the set feed rate constant. If a negative deviation of the mass flow is measured by the flowmeter 4 (e.g. −0.2%), the angular velocity of the metering device 8 is raised by the corresponding value, i.e. here by +0.2%, to keep the feed rate constant. It is of great importance that, through the arrangement of the metering device 8 a certain distance from the flowmeter 4 (here the combined height h of the free fall height and half the peripheral path), predetermined geometrical conditions are established, so that it can be calculated precisely by the metering controller 10 at what instant in time (time offset) the disturbance value (e.g. the deviation of −0.2%) occurs at the blow-out line 9. In dependence on the angular velocity of the metering device 8, also measured (e.g. by a tacho-generator on the motor 8a), a precise interval of time of 5 seconds for example can be determined, taking into account the height of fall h from the flowmeter 4 to the corresponding pocket of the bucket wheel gate here serving as the metering device 8 and the rotation through 180° (half the circumference), after which interval of time the disturbance value (negative deviation) occurs at the output point, i.e. the mouth into the blow-out line 9, subsequent to detection at the flowmeter 4 (by means of the force measuring cell 7). The metering controller 10 can thus issue the corresponding command to increase the speed of rotation by e.g. 0.2% at this point in time, or shortly before in view of the inertia of the metering device 8. Accordingly anticipatory regulation of the actual feed rate is possible with this apparatus 1, without dead time.

Figure 2:
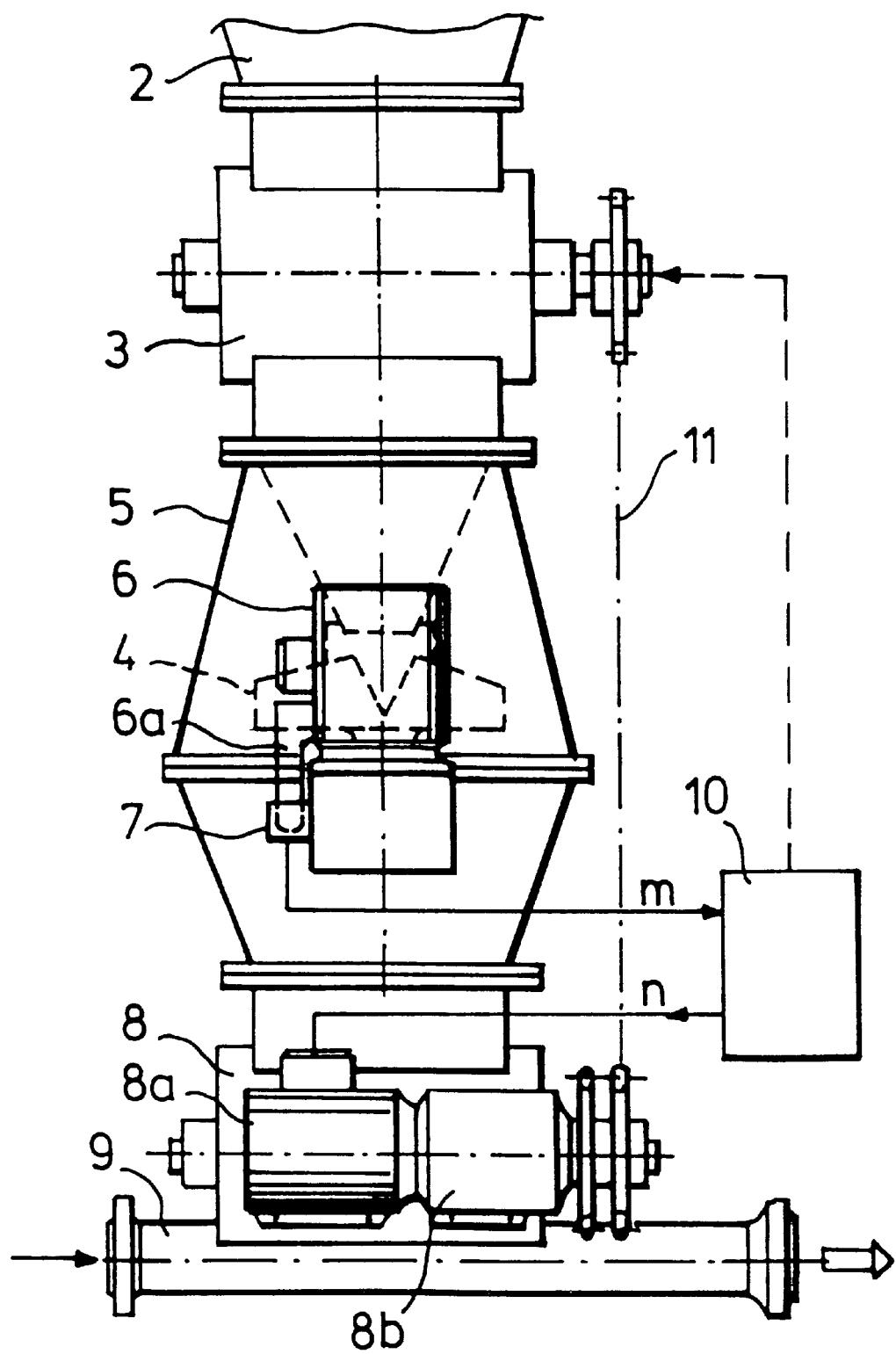
FIG. 2 is a side view according to FIG. 1.
Figure 3:
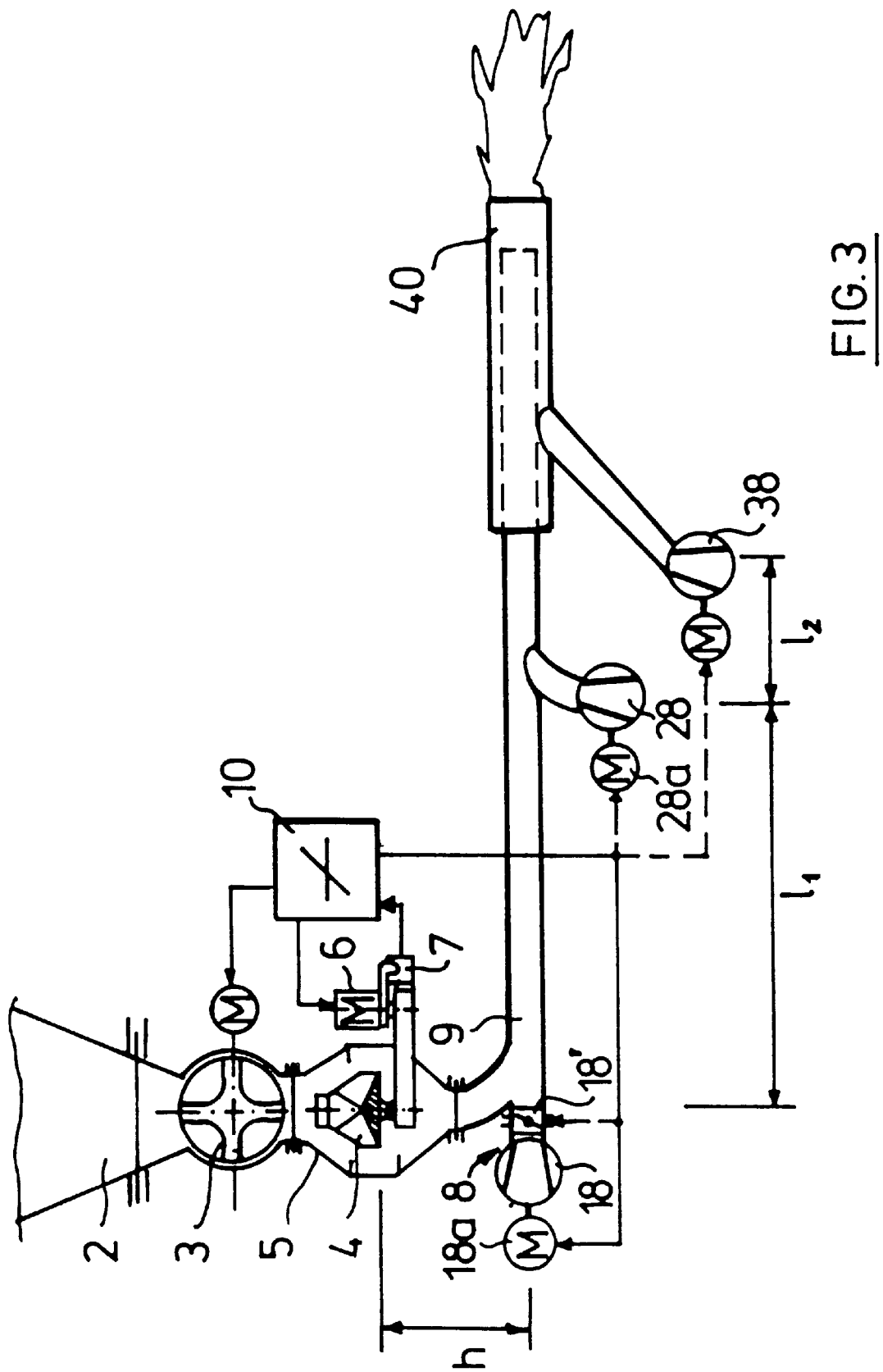
FIG. 3 is a schematic; modified embodiment of the apparatus according to FIG. 1 and FIG. 2, with a plurality of blowers for changing the amount of air in the feed and metering.

A side view of the apparatus 1 according to FIG. 1 is shown in FIG. 2, wherein the side arrangement of the drive motor 6 for the flowmeter 4 and of the motor 8a for the metering device 8 can be seen, also the arrangement of the blow-out line 9. It should be noted that metering augers or similar metering members could be used as the metering device 8 instead of the bucket wheel gate, wherein the adjustment is effected in particular by the change of speed of rotation of the metering device 8. In an advantageous arrangement the outlet apparatus 3 can also be controlled or regulated according to the results of measurement of the flowmeter 4 in order to keep the mass flow fed to the flowmeter 4 largely constant. In a particularly simple design however, it suffices to branch off a drive 11 from the motor 8a and an associated transmission 8b of the metering device 8, in order to achieve synchronous regulation of the upper and lower bucket wheel gates. Naturally, separate motors can also be provided, which are controlled by the metering controller 10 in an electronically coupled manner;

A modified embodiment of the device for continuous gravimetric metering and mass flow determination is shown in FIG. 3, wherein a feed blower 18 is provided as the metering device 8 for the metering and onward feed in a structure otherwise similar to FIG. 1 and FIG. 2. The drive motor 18a of the conveyor blower 18 is also here connected to the metering controller 10, so that it can be controlled on the basis of the feed path (height of fall h) from the flowmeter 4 to the opening into the blower line 9, in order to keep the feed rate constant at the corresponding time (appearance of the mass flow deviation), in that the speed of rotation of the conveyor blower 18 is briefly increased for example.

A further possibility for regulation consists in that a metering flap 18' is provided on the conveyor blower 18 to change the airstream and thus the discharge rate from the housing 5 in dependence on the instantaneous mass flow determined by the flowmeter 4. Thus, depending on a positive or negative deviation the air blown in by the feed blower 18 can be varied as a result of speed of rotation control of the drive motor 18a and/or the flap opening of closing of the metering flap 18', in order to maintain the set-point feed rate.

A further possibility consists in connecting a supplementary blower 28 to the blow-out line 9, wherein the drive motor 28*a* of the supplementary blower 28 is again connected to the metering controller 10, as is shown from a data node in broken lines. Here also fixed geometrical parameters exist, namely the distance from the flowmeter 4 to the openlng-in of the supplementary blower 28 composed of the height of fall h and the horizontal conveyor path $l_1$, so that precise statements can be made with a predetermined air speed, as to when the mass deviation detected by the flowmeter 4 occurs at the supplementary blower 28 and thus a corresponding adjustment can be effected at the right time by increasing or reducing the feed speed. Instead of altering the secondary air amounts and/or air speed, as a further alternative a primary air blower 38 can be regulated, wherein again fixed distances $h+l_1+l_2$ and thus time differences are prescribed between the flowmeter 4 and the opening-in of the primary air line of the primary air blower 38, so that a suitable retardation or acceleration of the mass flow can be effected by altering the amount of air or the air speed. The alteration of the primary air feed is essential in particular with furnace plants 40 in order to keep the air/fuel ratio constant. Thus it is also preferred to have the three illustrated blowers 18, 28 and 38 coupled together in a regulator integrated in the metering controller 10 for example, so that with an increase in the amount of air at the blower 18 there is a corresponding reduction of the amount of air supplied by the blower 38, in order to maintain not only the amount of fuel supplied but also the air/fuel ratio in accordance with the set-point values.

I claim:

1. A method of continuous, gravimetric metering and mass flow determination of flowable materials comprising:

determining instantaneous mass flow using a flowmeter; and obtaining an output of a metering device downstream of the flowmeter, wherein the output of the metering device is regulated to match a set-point flow rate with a time offset greater than zero that is dependent on the instantaneous mass flow determined by the flowmeter.

2. A method according to claim 1, wherein the flowmeter is a Coriolis measuring wheel.

3. A method according to claim 1, wherein the output regulation at the metering device is effected taking into account the distance (height of fall h; horizontal feed length $l_1$, $l_2$) between the flowmeter and the metering device.

4. A method according to claim 1, wherein the output regulation of the metering device is effected by altering the speed of rotation of the metering device.

5. A met hod according to claim 1, wherein the output regulation of the metering device is effected with a pneumatic feed by altering the amount of air.

6. A method according to claim 1, wherein the output regulation of the metering device is effected with a pneumatic feed by altering the amount of air and the air velocity.

7. A method according to claim 1, wherein the output regulation of the metering device is effected with a pneumatic feed by altering the air velocity.

8. An apparatus for continuous, gravimetric metering and mass flow determination of flowable materials, comprising:

a flowmeter for determining instantaneous mass flow;

a metering controller; and a metering device downstream of the flowmeter which produces an output, wherein the metering device is connected to the flowmeter through the metering controller, and wherein the output of the metering device can be regulated with a time offset greater than zero based on deviations in mass flow at the flowmeter.

9. An apparatus according to claim 8, wherein the flowmeter is a Coriolis measuring wheel.

10. An apparatus according to claim 8, wherein the metering device is connected through a first drive to an output device upstream of the flowmeter to regulate the flow of material to the flowmeter for synchronous operation of both the metering device and the flow of material to the flowmeter.

11. An apparatus according to claim 8, wherein the drive is in the form of a chain drive.

12. An apparatus according to claim 8, further comprising a first drive connected to an output device upstream of the flowmeter to regulate the flow of material to the flowmeter and wherein the metering device has a drive motor, and wherein the first drive is coupled electronically to the drive motor of the metering device for synchronous operation of both the metering device and the flow of material to the flowmeter.

13. An apparatus according to claim 8, wherein the metering device is in the form of a feed blower having a drive motor, and wherein the drive motor of the feed blower is connected to the metering controller.

14. An apparatus according to claim 8, wherein the metering device comprises an airstream metering flap.

15. A method of continuous, gravimetric metering and mass flow determination of flowable materials comprising the following steps:

determining an instantaneous mass flow of the flowable materials using a flowmeter;

moving the flowable martial to a metering device located a distance downstream of the flow meter; and controlling the metering device to obtain a controlled output of the flowable materials from the metering device by regulating the output of the metering device based on the instantaneous mass flow determined by the flowmeter and a time for the flowable material to travel from the flowmeter to the metering device.

* * * * *